(12) United States Patent
    Oxford (10) Patent No.: US 10,787,110 B2
(45) Date of Patent: Sep. 29, 2020

(54) LOAD LOCK INFLATABLE MARINE SYSTEM

(71) Applicant: Nathan Daniel Oxford, Pendleton, OR (US)

(72) Inventor: Nathan Daniel Oxford, Pendleton, OR (US)

( * ) Notice: Subject to any disclaimer, the term of this patent is extended or adjusted under 35 U.S.C. 154(b) by 0 days.

(21) Appl. No.: 16/350,302

(22) Filed: Oct. 30, 2018

(65) Prior Publication Data

US 2020/0001947 A1    Jan. 2, 2020

Related U.S. Application Data

(60) Provisional application No. 62/709,053, filed on Jan. 5, 2018.

(51) Int. Cl.
   *B60P 7/08*     (2006.01)
   *B60P 7/15*     (2006.01)
   *B63B 25/24*    (2006.01)

(52) U.S. Cl.
    CPC ............... *B60P 7/15* (2013.01); *B63B 25/24* (2013.01)

(58) Field of Classification Search
    CPC ........... B60P 7/15; B63B 25/14; A47H 1/022; A47H 1/08
    USPC ................... 410/143, 149, 150, 151; 114/75
    See application file for complete search history.

(56) References Cited

U.S. PATENT DOCUMENTS

| | | | | |
|---|---|---|---|---|
| 4,824,302 A * | 4/1989 | Schultheis | ............... | B60P 7/15 410/151 |
| 6,247,882 B1 * | 6/2001 | Huang | ..................... | B60P 7/15 410/143 |
| 2004/0175249 A1 * | 9/2004 | Elwell | .................. | B60P 7/0815 410/106 |

\* cited by examiner

*Primary Examiner* — Stephen T Gordon

(57) ABSTRACT

An apparatus for restricting cargo shipment within a load space of inflatable boats, rafts or any other similarly constructed container which includes a buoyant barrel receptacle containing a selectively adjustable telescoping pipe, each associated to symmetrically concavitated flange supports which are affixed to their respective distal end terminations, and being suitably mounted to provide for articulated movement on variably orientated and uneven sidewall surfaces, in order to become frictionally locked and unlocked by way of expansive force through a pivotally mounted fulcrum assemblage, and being incorporated with atmospherically impervious internally configured illumination systems.

1 Claim, 7 Drawing Sheets

# LOAD LOCK INFLATABLE MARINE SYSTEM

CROSS REFERENCE TO RELATED APPLICATIONS

This Application claims the benefit of Provisional Patent Application Ser. No. 62/709,053 filed Jan. 5, 2018 by the present inventor.

FEDERALLY SPONSORED RESEARCH OR DEVELOPMENT

None

SEQUENCE LISTING

None

TECHNICAL FIELD

This application relates to a selectively adjustable cargo tube lock apparatus and method for restricting cargos being transported and stored in inflatable boats and rafts.

BACKGROUND

A common problem has been the restricting of cargo in inflatable type boats and rafts. Without being securely braced any roll and pitch movement of the boat can cause the on loaded cargos to shift about the vessels hard, semi-hard or soft bottom floor space thereby causing damage to both the inflatable boat and the cargo. It is imperative that when cargos are being transported that they are braced and prevented from uncontrolled shifting and thus a means must be provided for limiting the movement values of any on loaded cargos. The undesirable latitudinal migration of said cargos can introduce consequential negative effects which can deduct joy from any occupying user experience. Resolving the cargo securement concern is not only important in protecting articles from risk of loss and damage but also affords increased safety to individual occupants against accidental harm and injury thus ensuring greater confidence for those exposed to dynamic cargos during the influence of transportive movement and irregular sea states. Therefore, various unrelated fashions have been manipulated unsuccessfully for use in inflatable watercraft.

Significant problems are often encountered when applying conventional bracing modes to inflatable water craft owing to the constitution of the vessels resilient fabrics and unique contours. Various conventional bracing modes have been disclosed. For example, in U.S. Pat. No. 4,343,578 by Barnes there is disclosed a load stabilizer for a truck which includes two telescoping poles which are held in expanded relation against the sidewalls of the truck bed by a locking assembly. Additional devices being similar in nature to Barnes are disclosed in U.S. Pat. No. 4,432,678 by Liebel in which a load retention system extends between the sidewalls of a container having screw apparatus for extending the load retainer between the sidewalls; U.S. Pat. No. 3,880,394 by Wisecarver in which a lead bracing device includes a pole with an adjustable end support which is threadably variable in adjustment by utilization of a nut, U.S. Pat. No. 4,737,056 by Hunt in which a brace for securing cargo inside a container having a cylindrical pole with pivotly mounted brackets at each end being threadably engaged for extending the brackets between the sidewalls of a container, and U.S. Pat. No. 5,281,063 by Austin III in which a pair of telescoping tubes with resilient bulbous end footings extend between two sidewalls and are frictionally held by internal rotating cam mechanics.

Other bracing devices include U.S. Pat. No. 3,171,627 by Tapley et al, which discloses an adjustable widget for shoring walls, roofs and the like during construction or repair and U.S. Pat. No. 891,897 by Astrom which discloses a trench brace and utilizes a threadably engaged end portion which is adjusted to very the length of the brace. The use of these foregoing devices to restrict cargo being transported and stored in inflatable boats and rafts share many deficiencies, the most notably being their inability for use on containers having relatively relaxed and uneven contours. Therefore, the use of these conventional bracing methods is not a practical solution for use on resilient and contoured sidewalls as are commonplace with inflatable water vessels. Understanding of the foregoing prior art does not uncover or disclose lightweight, simplified and reliable cargo locks able to be effectively utilized on inflatable boats and rafts which are easily installed, adjusted and removed with minimal physical effort and user know how. The teachings of these above patents do not appear to be at all applicable to restrict the movement of cargos when cargos are transported and stored in containers having relatively resilient and contoured surfaces.

Furthermore, separate bracing styles not being related to the foregoing patents include service of natural/synthetic line, rubberized/elastic bungee cords, mechanical ratchet strapping systems, wire rope (cable) and fibrous net. None of these mentioned provide for an adequate means of bracing cargos within the floor space of inflatable boats and rafts from slipping and shifting latitudinally but are only capable of obstructing cargos from being ejected from the interior of the boat. In addition to inefficiencies, few of said fashions have a propensity for becoming hazardous and potentially causing injury and damage to individual occupants, cargos and the inflated vessel. Bungee cords being particularly dangerous must be manually elongated by force over the width of the boat before being attached to manufacture installed tie-down locations upon the inflatables air chambers, and there remain under powerful tensions. Many persons cannot provide sufficient physical strength to properly manage such a method rendering it restrictive toward elderly, young, physically weak and disabled individuals. Natural/synthetic line requires extensive comprehension of knot tying techniques which are time consuming, inconvenient and take up valuable space. Ratchet straps, wire ropes and netting are prone to rusting and rotting, require persons skilled in their applications, perpetual maintenance, additional tooling and eventual replacement. All these bracing modes prove impractical as considered for inflatable boats and rafts. Therefore, the brace should be developed specifically for the unique construction of inflatable water craft so as not to cause damage to persons, cargos and container. Insofar as I am aware no adjustable cargo load lock device formally developed have had any intended purpose or practical application of use within inflatable boats, rafts and other inflated water vessels.

SUMMARY OF INVENTION

The present invention pertains to a selectively adjustable cargo restricting widget which braces cargos from moving about inflatable water vessels load space latitudinally. In accordance with one or more embodiments, a cargo load lock comprises: a buoyant tubular body, an adjustable telescoping inner sleeve, mechanical locking levers, resilient or ridged, jointed or fixed; contoured end flanging, drain holes and weather/shock proof variable illumination systems.

Advantages

Accordingly, several advantages of one or more aspects are as follows: to provide a quick, safe and convenient load bracing process specifically for inflatable boats and rafts of various size, makes and models, being user and vessel friendly having attractive construction which will not require oils and lubricants, which can be easily installed and removed, that is relatively inexpensive being manufactured in various designs, colors, printings and engravings, that will float its weight in fresh, salt and brackish waters, being light weight, constructed of high quality, long lasting materials and components, which is easily stored, transported and managed, having independently operated battery powered internal lighting systems, being shock and weather proof and which does not interfere with local and federal laws, regulations or marine navigation standards. While the present embodiment is susceptible of various modifications and alternative forms, it should be understood however, that it is not intended to limit an embodiment to the particular forms disclosed, but on the contrary, the intention is to cover all modifications, equivalents and alternatives falling within the spirit and scope of the invention as expressed in the claims. Therefore, these and other advantages will become more readily apparent upon reading the following detailed description and upon reference to the attached drawings.

DRAWINGS

Figures

In the drawings closely related figures have the same number but different alphabetic suffixes.

REFERENCE NUMBERS

10A/10B Tractionated pads or surfaces
12A/12B Concavitated flange supports
14A/14B Power selection interchange
16A/16B Optical instrument view ports
18 Buoyant housing structure
20A/20B Drain openings
22 Telescoping sleeve
24 Handle lock
26 Lever arm
28 Action arm
30A/30B Lever arm connecting fasteners
32 Action arm connecting fastener
34 Grab apertures
38A/38B Action arm races
40 Dampening material
42 Handle lock connecting fasteners
44A/44B Battery access portal
52A/52B Internal electronics package
56A/56B Battery access port fasteners

DETAILED DESCRIPTION

Figure 1A:
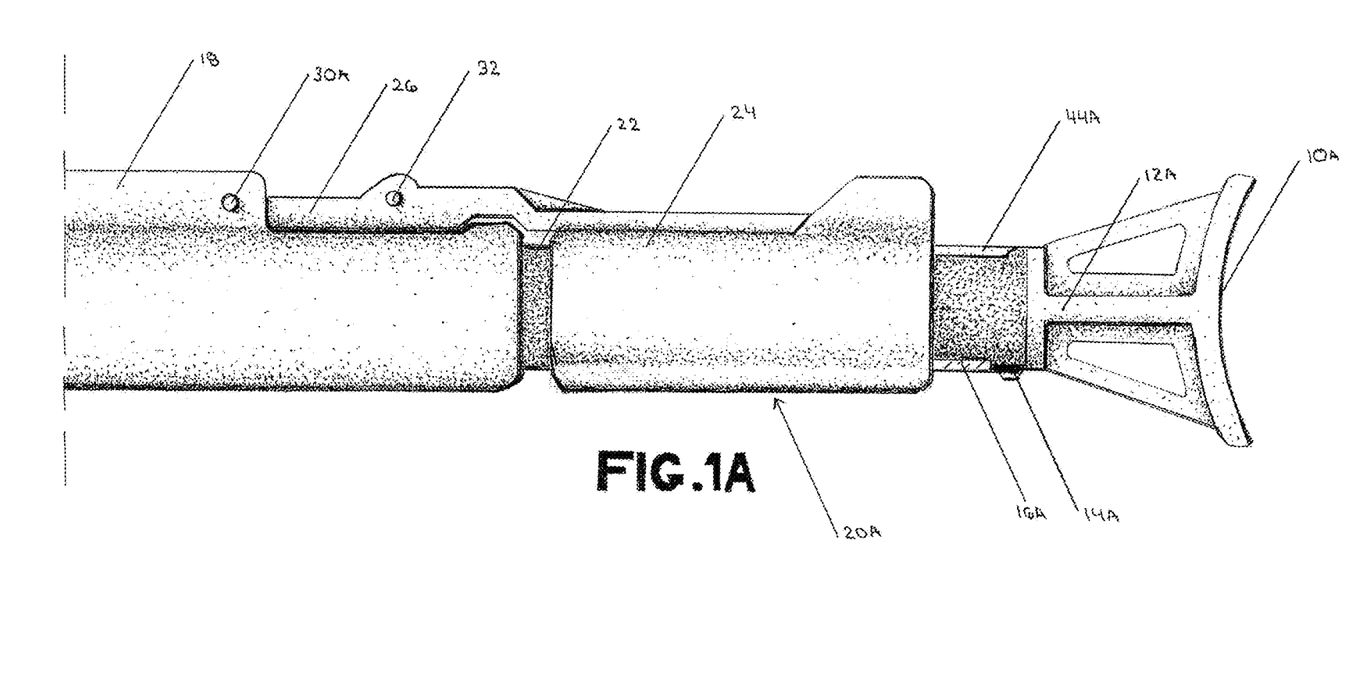
FIGS. 1A/1B show a full-length profile view of a load lock in a contracted pose with mechanical armatures in a closed and locked position in accordance with one embodiment.
Figure 1B:
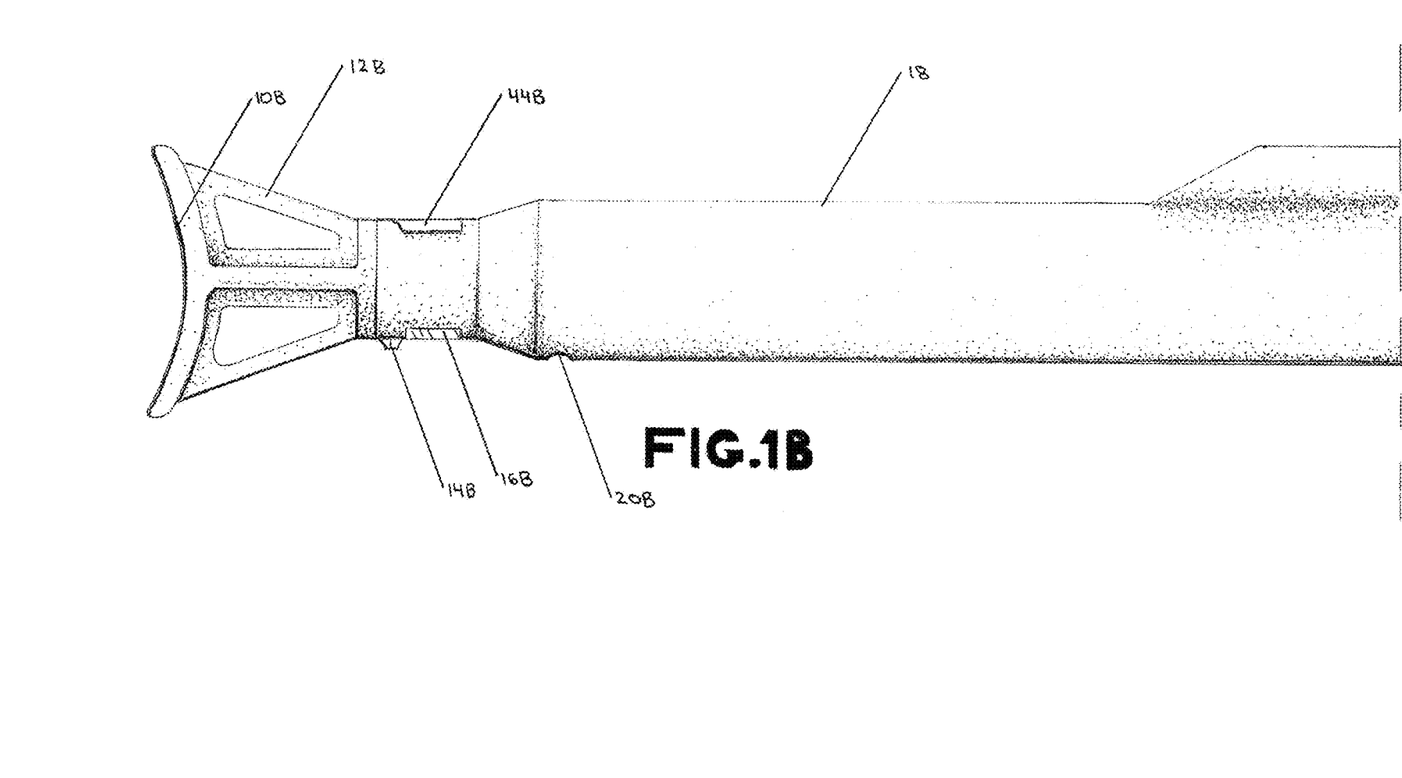

With continued reference to the drawings, the present invention relates generally to a cargo load lock brace that restricts cargos from shifting latitudinally throughout the load space of inflatable boats, rafts and other similarly shaped containers. Referring now to FIG. 1A/1B which is a two-part drawing, showing a full-length profile view of one version of a load lock in a contracted pose, which includes first an elongated buoyantly comprised cylindrical structure 18 within which is supported a second lesser in circumference selectively adjustable telescoping sleeve 22. Both first and second mentioned members having relatively yieldable vertically mounted concavitated flange supports 12A/12B which have fractionated pads or surfaces 10A/10B situated at their distal ends, relative to the load lock's central location, which enables certain frictional engagement towards spherically contoured flexible sidewalls commonly found with inflatable boats and rafts of conventional construction, having generally tubular outer structures.

Figure 3:
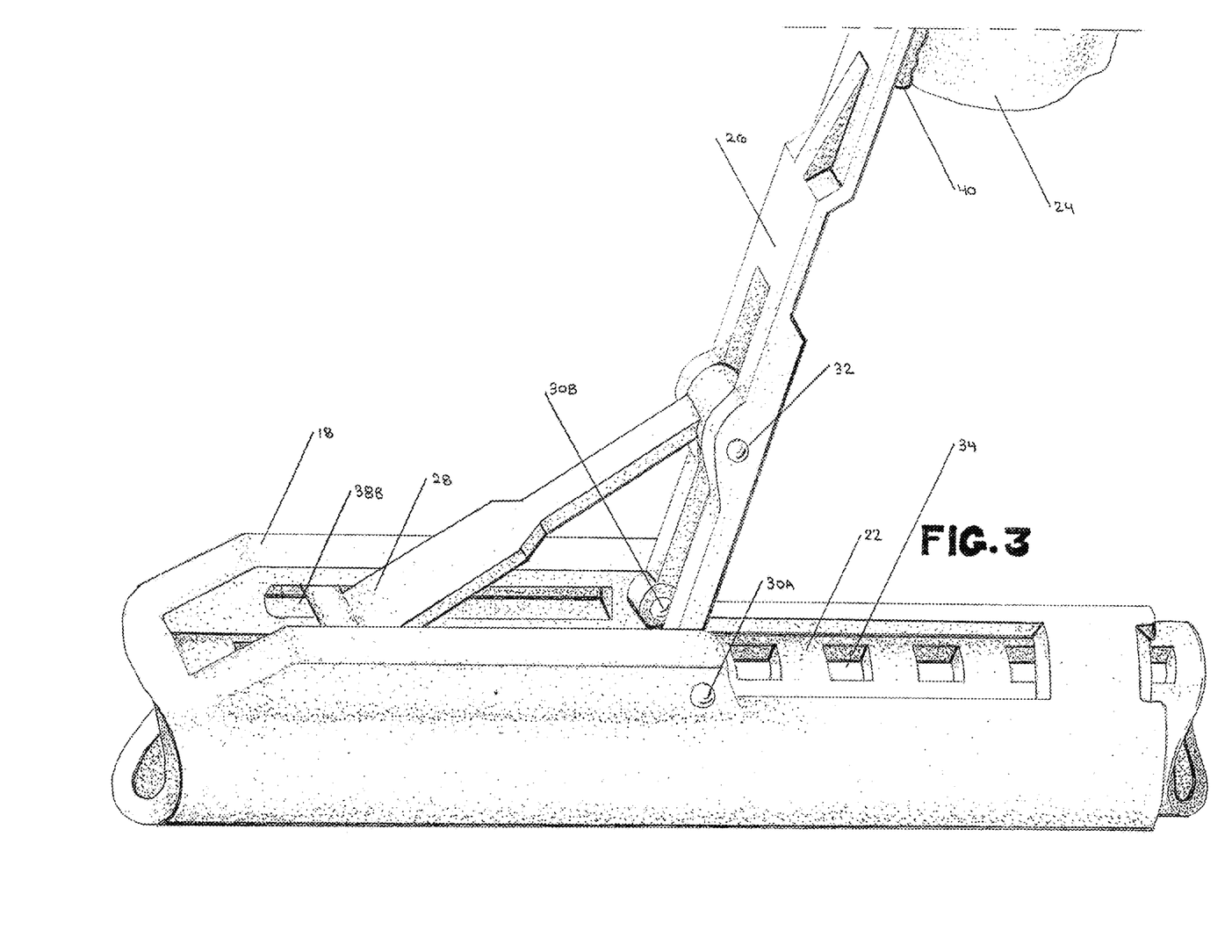
FIG. 3 shows a partial perspective view of one version of a load lock with mechanical armatures in an open and unlocked position in accordance with one embodiment.

FIG. 1A reveals one embodiment of the load locking widgets upwardly mounted hinged mechanical configuration which includes lever arm 26 which is pivotally connected to the ridged buoyant housing 18 through way of lever arm connecting fasteners 30A/30B which allows lever arm 26 freedom of travel from a relatively parallel position when down in relation to the load locks horizontal pose to a perpendicularly obtruse angle being greater than 90 degrees of travel as partially illustrated in FIG. 3. Extending rightwardly in relation to lever arm connecting fasteners 30A/30B, lever arm 26 continues above telescoping sleeve 22 and attaches to handle lock 24 by handle lock connecting fasteners 42 which are displayed in FIG. 3. In some versions of the load lock handle lock 24 is backed by a shock dampening material 40 which is similar in plan layout to lever arm 26 fabricated footprint, and there by is easily assembled between handle lock 24 and lever arm 26 being made fast by handle lock connecting fasteners 42.

One version of the load locking widgets anticipated mechanical assemblage is embodied in FIG. 3 of the drawings which depict a partial perspective detail which illustrates the symmetrically molded cylindrical housing 18 having selectively placed elevated sections wherein action arm race 38A/38B are arranged, and within which is supported a lesser in circumference telescopically orientated sleeve 22 which provide for elongated adjustments through incrementally located grab apertures 34 positioned lengthwise throughout the adjustment range and upon the apex of telescoping sleeve 22. Lever arm 26, depicted in FIG. 3, is in a raised orientation and pivotally connected to buoyant housing structure 18 by lever arm connecting fasteners 30A/30B shown here in FIG. 3 as a type of through pin fastener, which allows for the unrestricted rotational movement of lever arm 26.

Inner located in orientation to lever arm 26, and action arm race 38A/38B, is action arm 28, which incorporates lever arm 26 through a action arm connecting fastener 32 being a joint characteristically similar to lever arm connecting fasteners 30A/30B, therefore to provide unrestricted rotational movement of action arm 28 and lever arm 26 as articulation is carried out in the pivotal swing and arch as is clearly illustrated in FIG. 3. One version of action arm 28, in FIG. 3, shows connecting fastener 32 conjoined at a measure of interval in relation to connecting fasteners 30A/30B and joined in remote location higher up the construction of lever arm 26. This particular arrangement allows for a mechanical advantage, which is an integral function of the present load lock's capacity to overcome resistance as the load lock is applied transversely across an inflatable boat's load space, and telescopically engaged against the sidewalls of the container. Greater disclosure of this configuration will be discussed in further detail in a following operation segment.

Again in FIG. 3, action arm 28 cooperates in symphony with action arm races 38A/38B by junction of peg styled extrusions or convexities which extend outwardly from action arm 28 profile. Both bisects of action arm 28 inhabit a corresponding action arm race 38A/38B in guide fashion which allows for the directed, combinated rise and fall movement of the entire mechanical assemblage, including lever arm 26, action arm 28, lever arm connecting fasteners 30A/30B and action arm connecting fastener 32, by the disclosed supporting framework, and furthermore will enact arc swing limits by way of impediment. In accordance with one embodiment, action arm 28 includes an underside capture instrumentality (not shown) which functions in conjunction with grab apertures 34 as to lock and unlock the load lock device from extending and contracting, and more specifically towards, telescoping sleeve 22. The underside capture of action arm 28, which is not shown, is essentially a homogeneous third extrusion, relative to the lateral extending members that couple with action arm races 38A and 38B.

Figure 2A:
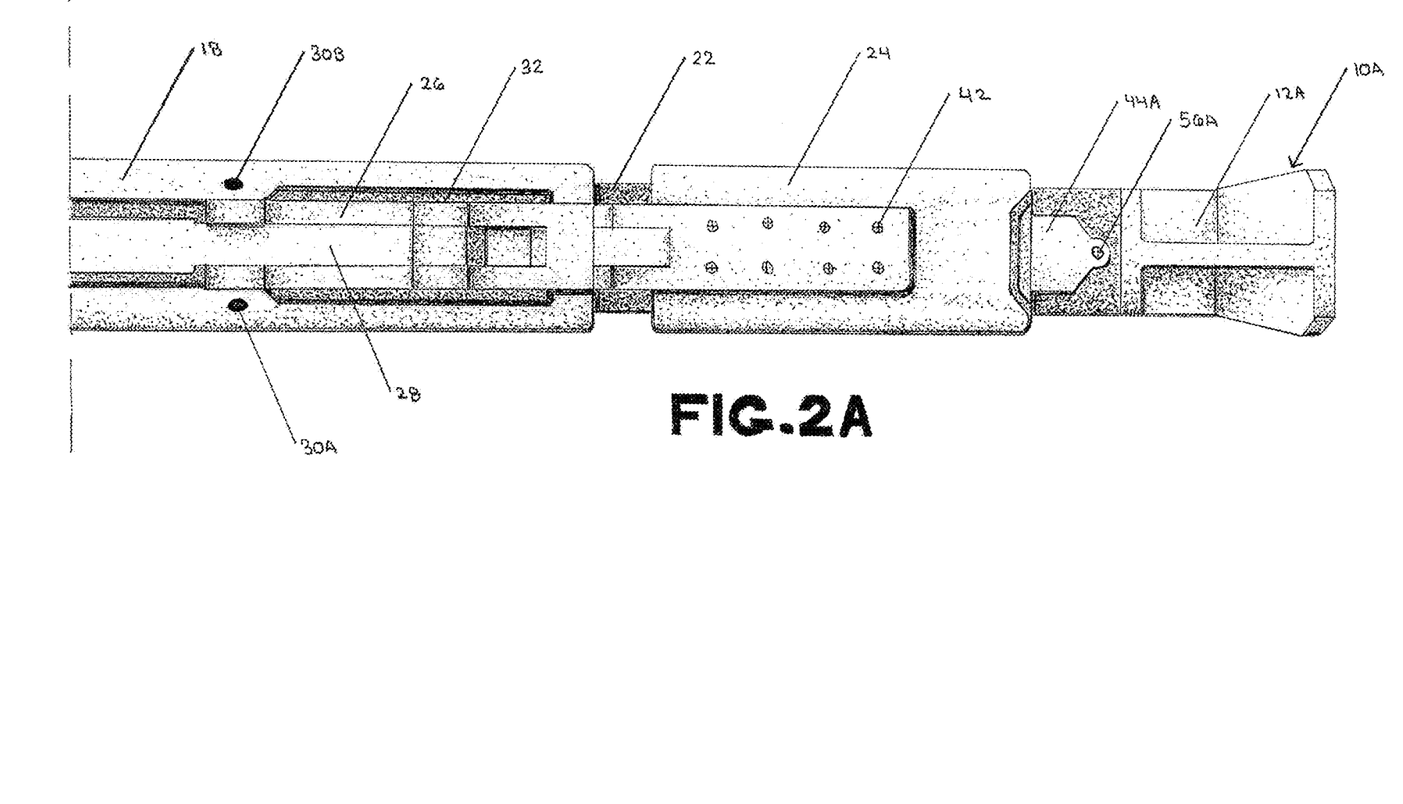
FIGS. 2A/2B show a full-length top view of a load lock in a contracted form with mechanical armatures in a closed and locked position in accordance with one embodiment.

Referring back to FIG. 1A, one version of handle lock 24 is illustrated in a plan view, reposed in a closed shut position, and encompassing telescoping sleeve 22 in a strangulated fashion. Handle lock 24 is there mounted to the underside of lever arm 26 through a series of handle lock connecting fasteners 42 in accordance with one embodiment, as shown in FIG. 2A of the drawings. The anticipated construction of handle lock 24 possesses an upward section, being uniform in circumference with respect to the buoyant housing structure 18 and having a lower section disjunctioned with a separateness slightly narrower than the diameter of telescoping sleeve 22 which effectively permits handle lock 24 to transition on and off telescoping sleeve 22, with minimal effort of force, and by way of pliant materials construction which allow for handle lock 24 to rebound repeatedly to its unique configuration. One version of a load lock may include engineering handle lock 24 with shock and vibration dampening material 40, as referenced in FIG. 3 which may provide a more suitable exploitation of the load lock's action.

Figure 4:
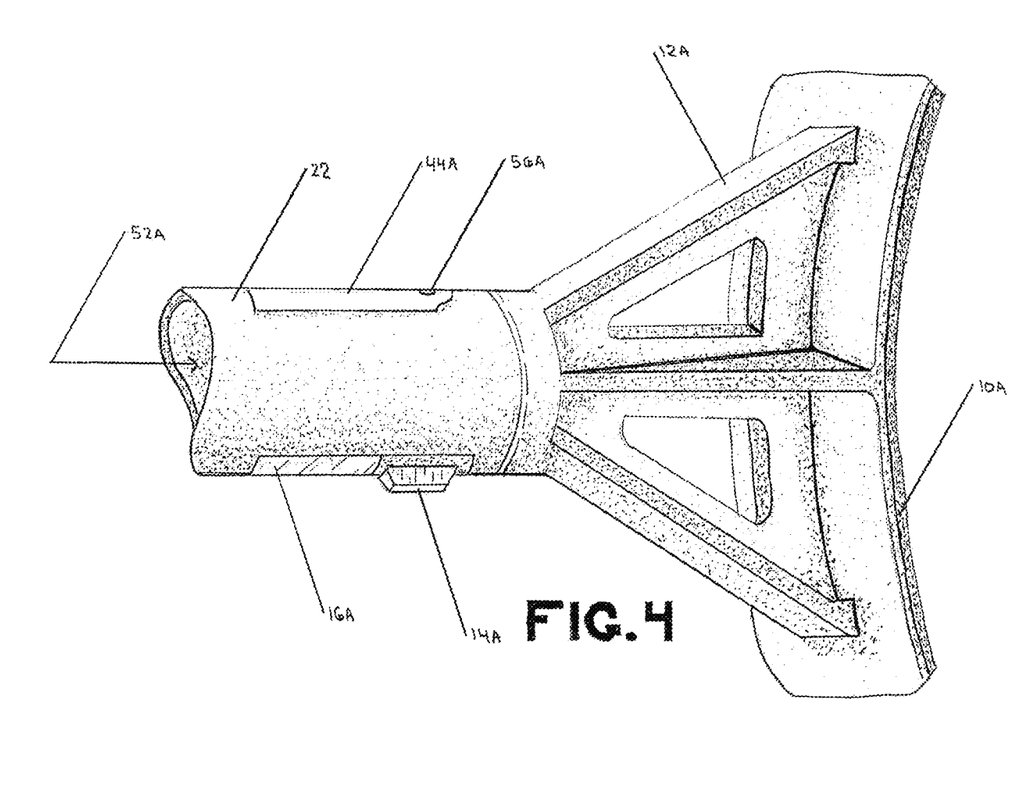
FIG. 4 shows a perspective view of one version of a load lock contoured end structure in accordance with one embodiment. Note: Electrical circuitry not shown.

In FIG. 4 of the drawings, there is shown a concaved flange support 12A, which is illustrated in a plan side view. In accordance to one version, flange support 12A is referenced in FIGS. 1A and 2A as being located at the load lock's rightward distal end, and shares a mirror copied flange support 12B on the load lock's leftward distal end, as disclosed in FIGS. 1B and 2B of the drawings. Support 12A is distinguished separate and apart from support 12B through attachment location points. Support 12B couples with the left end of housing structure 18, as where flange support 12A couples with the right end of telescoping sleeve 22. Therefore, left and right end supports 12A/12B reside far opposite of each other in relation to the load lock's central location.

Figure 2B:
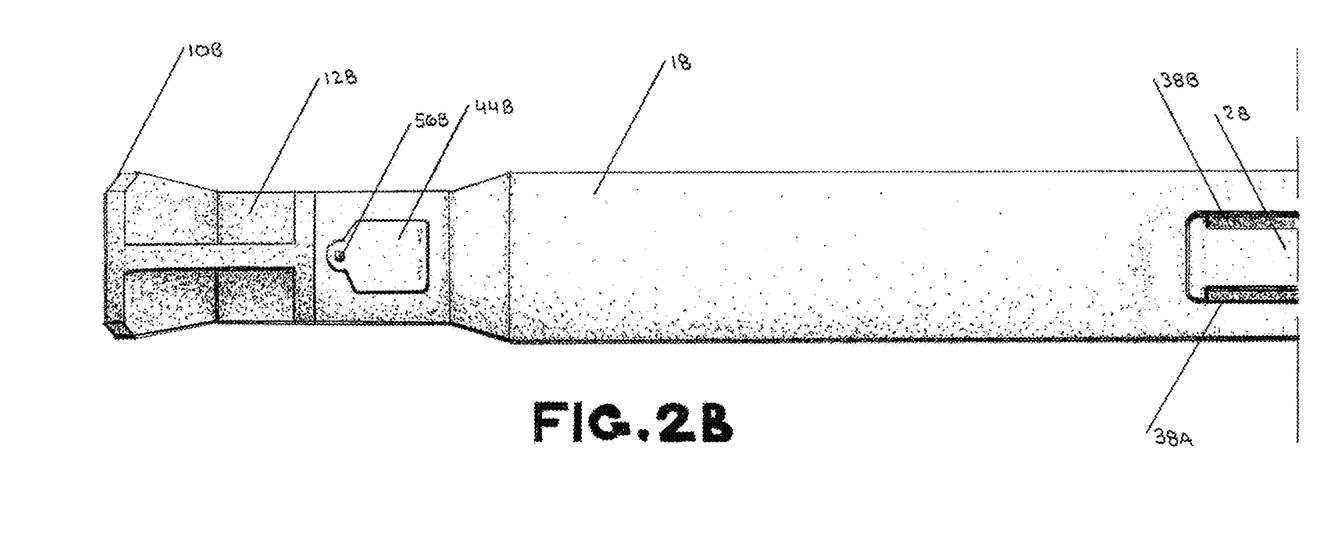

The present embodiment of both left and right located flange supports 12A/12B generally include a stationary configured cylindrical receptacle segment, which is tubular in fashion and suitably bound to the leftward end termination of buoyant housing structure 18 as related to flange support 12B which is shown in FIGS. 1B and 2B, and to flange support 12A likewise bound to the rightwardly termination of telescoping sleeve 22, as shown in FIGS. 1A and 2A of the drawings. Both left and right end receptacle segments, being identical in function and purpose, are in relation reversed in configured form, similar to a reflected mirror image. Having flush mounted battery access portals 44A/44B which are suitably interconnected at the vertex locations of the receptacle segments, which are associated to uniformly inset optical instrument viewports 16A/16B which are suitably interconnected to the base location of the cylindrical segments, generally opposite the battery access portals 44A/44B, and being in direct proximity to power selector interchange 14A/14B.

An atmospherically impervious interior of the cylindrical portions of flange support 12A and 12B incorporate a variably selected internal electronics package 52A/52B (not shown) as referenced in FIG. 4. In accordance to one version, the internal electronics package 52A/52B are rigidly mounted against the interior enclosure walls of the cylindrical segments of flange supports 12A and 12B, in a solidified arrangement which is formed to disallow the unwanted intrusion of externally produced environmental conditions, and causative shocks or impacts. The internal electronics 52A/52B, which are not shown, are for the production of visible light which are generally variably engaged in pattern, degree and variegation, being manually operated through an independently operated power selection interchange 14A/14B, which are generally atmospherically impervious to external environmental conditions, shocks and impacts. Electronic energizement for the internal electronics package 52A and 52B are produced through wet or dry cell voltaic battery assemblage (not shown) which are made available for installation, replacement or removal by way of battery access port 44A/44B which are generally constructed as atmospherically impervious to externally produced environmental conditions, and are secured to their respective flange support 12A and 12B by battery access port fastener 56A/56B, which is in accordance to one version of the invention.

Figure 5:
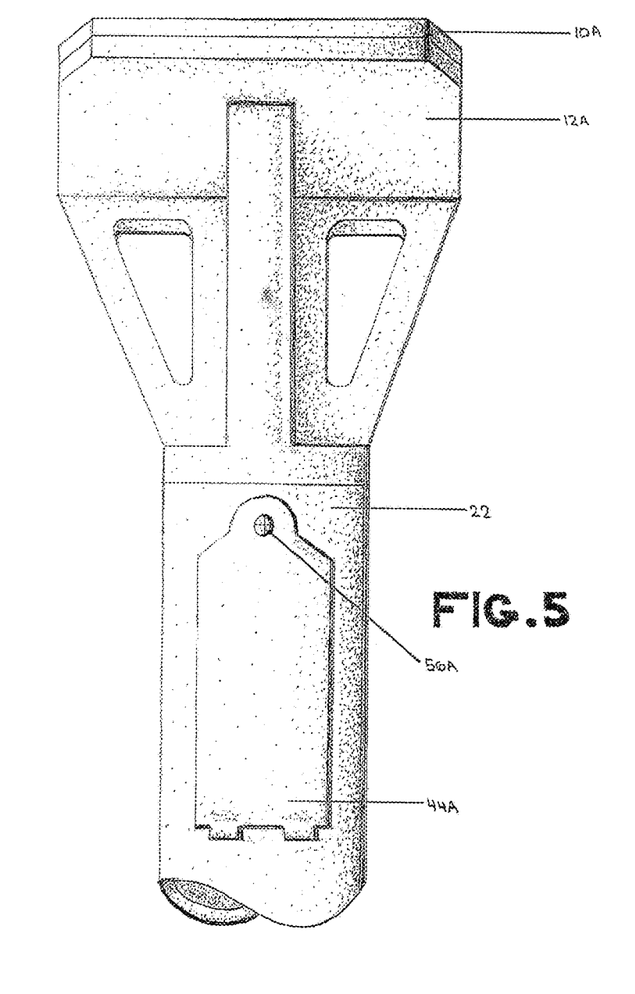
FIG. 5 shows a top view of one version of a load lock contoured end structure in accordance with one embodiment. Note: Electrical circuitry not shown.
Figure 6:
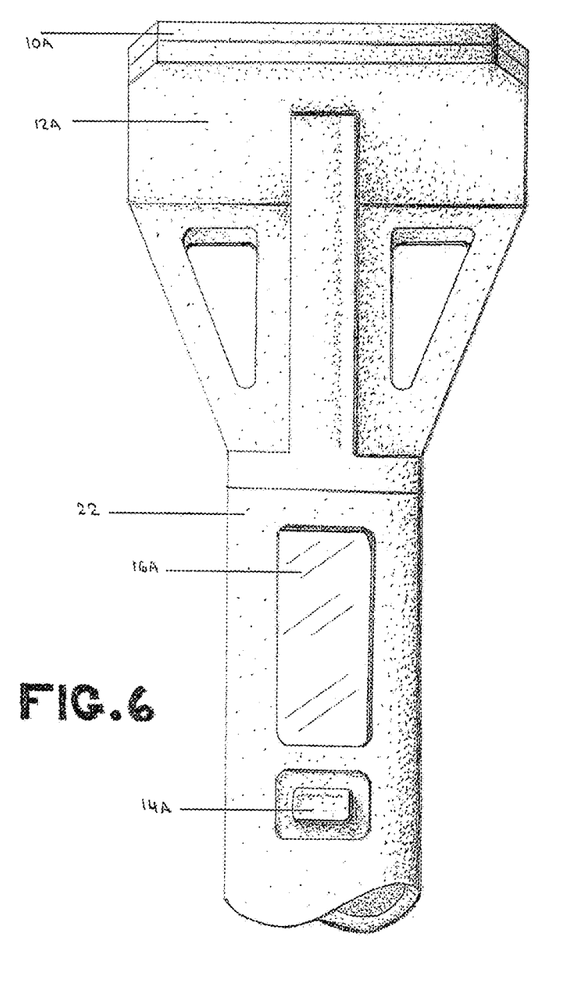
FIG. 6 shows a bottom view of one version of a load lock contoured end structure in accordance with one embodiment. Note: Electrical circuitry not shown.

Interconnected to the rightward termination point of cylindrical segment of flange support 12A, and to the leftward termination point of cylindrical segment of flange support 12B, in relation to the load locking braces center location is a symmetrically expansive framework as shown in FIGS. 4, 5 and 6 and in accordance with one embodiment. Converting from the expansive framework is a perpendicularly fashioned concaved planular flange support 12A and 12B, which share a similar spatial line to the widget's tensioning mechanics, more specifically, lever arm 26 and action arm 28. The planular flange having a generally rectangular face and being in approximate width and height of buoyant housing structure 18 as to continue the attractive lineament of the load lock's profile. Attached to, or being a part of, the outward aspect of the concaved flange support 12A/12B are joined tractionated pads or surfaces 10A and 10B, which partially or entirely cover the actual area of the planular flange facing as in accordance to one version of the invention.

This is one version of what I presently contemplate for the present invention, yet it may be altered by means, method or processes which would achieve the same or similar desired outcome and effect. One embodiment can be comprised of positively buoyant materials, having rigidly affixed semi-resilient outer end supports which contain integrated illumination systems as in the present embodiment, but may also be made using non-buoyant materials, having pivotally coupled concaved flange supports which allow for the hinging, swivel or rotational movements of the load locks distal ends. Many construction variations fall within the range, scope and spirit of the aforementioned invention. Composition can be of relatively ridged, semi-ridged, or flexibly resilient high strength plastics or any combination of such. With other variations being comprised of any other materials that may be found suitable for use such as polypropylene, PVC, HDPE, UHMW, polymers, vinyls, nylons, carbonated fibers, metals, metal alloys, rubbers, impregnated and fibrous laminates, epoxies, resins, foams, plasticized fabric materials or any other combination or configuration which can be used to achieve the desired outcome and effect.

OPERATIONS

The present invention generally relates to an apparatus and method for bracing cargo of various shapes and sizes, which are located inside the load space of a container having generally spherical sidewalls of a relatively resilient nature, as are common on inflatable boats, rafts and other containers of conventional construction having generally tubular outer structures. This load lock widgets intended use and purpose will be described for bracing cargo within these types of containers so that the placed cargo is prevented from shifting when the container is moving or being transported. In one exemplary narrative, the manner of using this load lock to achieve its purpose is to first begin by placing the cargo against the inner sidewall portions within the confines of the vessel's forwardly located load space, referred to hereafter as the bow of the container, for descriptive purposes of this example.

The vertical rise of tubular sidewalls from the floor of various inflatable type boats provides a hindrance for the abutment of multiform cargos to become persuaded against. In this particular narrative, the example is of cargo which is placed against the inner bow location, more specifically referring to where the left and right sidewalls unite. The procedure of employing the load lock device is to then station the load lock within the interior load space of the container in a transverse configuration in relation to the front and rear whereabouts of the vessel. Holding the load lock in between the containers left and right sidewalls in a generally horizontal pose the device will be generally parallel to the vessels floor plane.

A user then situates the load lock in a relatively perpendicular orientation rendering concaved flange support 12A and 12B vertical. In this pose the upper assemblage of the load locks tensioning mechanics are clearly apparent and are in opposition with the user. With cargos placed and engaged against the vessel's inwardly located sidewalls, the user sets flange support 12B upon the vessels left spherical convexity by contacting tractionated pad/surface 10B to the exterior facing of the containers port (left) tube structure. The user will then, while holding the load lock in place, lifts handle lock 24 away from the device thereby unclasping handle lock 24 from its held position on telescoping sleeve 22 resulting in the disengagement of action arm 28 from a series of grab apertures 34, which liberates telescoping sleeve 22 allowing it freedom to move in and out of buoyant housing structure 18 through manual manipulation of the user.

While tractionated pad/surface 10B remains in contact to the container's port (left) side chamber, and having handle lock 24 adequately raised away from the load lock allowing for detachment of action arm 28 from its placement upon telescoping sleeve 22, the user manually extends sleeve 22 by sliding it out and away from within buoyant housing structure 18 thus abridging the space interval in between contoured flange 12A in relation to the inside surface of the vessels starboard (right) side chamber. Elongation will continue until flange support 12A, and more specifically, fractionated pad/surface 10A meets the contoured vertical rise of the vessels starboard chamber and there comes to rest. Port, starboard and bow chambers aforementioned generally define the sidewalls of the container. Balanced upon the port and starboard sidewalls, the user then positions the load locks terminal surface transversely abutting the opposing façade of the cargo to be secured.

In the aforementioned position, the user simply depresses handle lock 24 bringing it back on its axis toward telescoping sleeve 22 therefore effecting lever arm 26 in conjunction with action arm 28 accordingly interlocking into one of multiple grab apertures 34, which are established upon the apex crown of telescoping sleeve 22. Accordingly, in order to achieve the load locks bracing function, handle lock 24 is continued through its downwardly arching motion furthering the load locks expansive force by way of mechanical advantage, which frictionally locks the distal ends of the brace onto the outer exposed surfaces of the vessels tubular sidewalls. Tractionated pad/surface 10A/10B ensure the prevention of unwanted movement of the load lock in all environmental conditions. Furthermore, handle lock 24, being constructed of relatively pliant materials, allows for the partial flexation of its underside disjunction permitting a momentary transfiguration as it is continued back over sleeve 22 returning to its original configuration at the bottom of the movement, therefore encompassing sleeve 22 rendering the apparatus to a closed shut configuration.

Furthermore, in accordance to the present embodiment, the user is able to compel the activation of independently operated multi-phase lighting systems which produce by way of internal electronics package 52A and 52B (not shown), which are generally energized through battery storage, or any similar modes of generization suitable for apparatus.

To obtain a desired effect, the user locates power interchange 14A, 14B or both, and manually presses the selector 14A/14B, which enlivens the system to one mode. Further depressment and release cycles available displayed lighting intensities, patterns and variegations which scintillate through downwardly disposed optical viewports 16A/16B until the circuit interruption mode is reached which de-energizes the internal electronics 52A/52B rendering the lighting system powered down and off. Accordingly, the user may access the internal electronics package 52A/52B for battery installation, replacement and removal through conveniently situated battery access portals 44A/44B, which require simple manipulation of access port fasteners 56A/56B.

CONCLUSION, RAMIFICATIONS AND SCOPE

While the above description contains much specificity, these should not be construed as limitations on the scope, but rather as an exemplification of one [or several] embodiments. Therefore, many other configurations are possible, including: multi-formed shapes, dimensions, modes of function, ornamentation, utility, materials, surfaces, colorations, printings and engravings. Accordingly, the reader will see that my Load Lock Inflatable Marine System provides for a more reliable and complementary method of securing cargo within the load space of inflatable boats, rafts and other similar containers, providing for a more rapid, safe and convenient system of cargo securement that is more compatibly configured toward inflatable craft, and more appealingly constituted for individual occupants, animal companions and the environment.

Thus the reader will see that at least one embodiment of the Load Lock Inflatable Marine System provides for a more trustworthy, lightweight, high quality, attractive devise that can be used by persons of almost any age and skill level. The load lock system disclosed here is contemplated to be positively buoyant in fresh, salt and brackish waters, which enables effortless recovery from the water surface. It provides various drain openings which disallow retention of liquids and other pervading substances, being conceivably fashioned with dual independently operated, water, shock and shatter resistant lighting systems, which provide for load space illumination without negatively obstructing individual persons vision capacity, or interfering with marine time navigational standards and regulations, and that can be made to pivot, rotate and otherwise articulate in a fashion suitably accommodating for variable and uneven installations. Accordingly, the scope should be determined not only by the embodiment illustrated, but also by the appended claims and their legal equivalents.

I claim:

1. A cargo bracing bar system comprising:

an elongate buoyant outer circular cylindrical tube member which can float;

an elongate inner circular cylindrical tube member with a longitudinal axis and including a plurality of square through holes extending along the longitudinal axis, wherein the inner tube member is telescopically received in the outer tube member;

a pivoting lever arm coupled to the outer tube member;

an action arm pivotally coupled to the lever arm;

an elongated race slot in the outer tube member;

a handle lock attached to the lever arm adjacent to a shock damping material;

ports in the outer tube member providing for water drainage;

a respective concave flange support on each of opposing ends of the tube members and including a tractioned pad, the flange supports each directly engaging curved flexible sidewalls of an inflatable boat;

and a plurality of electronic component assemblies with each assembly containing a light source, one of the plurality of electronic component assemblies being at respective ends of the bracing bar adjacent each of the concave flange supports;

wherein a distal end of the action arm is slidably received in the race slot to provide for extension and retraction of the inner tube member.

* * * * *